(12) United States Patent
Lee et al.

(10) Patent No.: US 7,848,276 B2
(45) Date of Patent: Dec. 7, 2010

(54) APPARATUS AND METHOD FOR SUPPORTING RELAY SERVICE IN MULTIHOP RELAY BROADBAND WIRELESS ACCESS (BWA) COMMUNICATION SYSTEM

(75) Inventors: Mi-Hyun Lee, Seoul (KR); Hyun-Jeong Kang, Seoul (KR); Jae-Weon Cho, Suwon-si (KR); Sung-Jin Lee, Seoul (KR); Young-Bin Chang, Anyang-si (KR); Joon-Young Choi, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 873 days.

(21) Appl. No.: 11/803,158

(22) Filed: May 11, 2007

(65) Prior Publication Data

US 2007/0280292 A1 Dec. 6, 2007

(30) Foreign Application Priority Data

May 11, 2006 (KR) ............... 10-2006-0042592

(51) Int. Cl.
*H04W 4/00* (2009.01)
(52) U.S. Cl. ............... 370/315; 370/328; 455/67.7
(58) Field of Classification Search ............... None
See application file for complete search history.

(56) References Cited

U.S. PATENT DOCUMENTS

2006/0148408 A1* 7/2006 Cho et al. ............... 455/67.7
2008/0025251 A1* 1/2008 Lee et al. ............... 370/328

FOREIGN PATENT DOCUMENTS

| KR | 1020060066615 | 6/2006 |
| KR | 1020070021914 | 2/2007 |
| KR | 1020070058479 | 6/2007 |

* cited by examiner

*Primary Examiner*—Erika A Gary
(74) *Attorney, Agent, or Firm*—The Farrell Law Firm, LLP

(57) ABSTRACT

Apparatus and method for transmitting and detecting subchannel constitution scheme information in a multihop relay Broadband Wireless Access (BWA) communication system. The method includes determining a subchannel constitution scheme for fixing a start zone of BW-RS link according to channel information (e.g., channel condition information, interference, and mobility), transmitting determined subchannel constitution scheme information of the start zone using a FCH preamble, detecting physical channel signals of subchannel constitution schemes from the received FCH preamble, checking preset codes, and detecting the subchannel constitution scheme of the start zone using the detected physical channel signals of the subchannel constitution schemes and the codes. The subchannel constitution scheme of the BS-RS link can be adaptively applied based on the channel information.

52 Claims, 15 Drawing Sheets

APPARATUS AND METHOD FOR SUPPORTING RELAY SERVICE IN MULTIHOP RELAY BROADBAND WIRELESS ACCESS (BWA) COMMUNICATION SYSTEM

PRIORITY

This application claims priority under 35 U.S.C. §119 to an application filed in the Korean Intellectual Property Office on May 11, 2006 and assigned Serial No. 2006-42592, the contents of which are incorporated herein by reference.

BACKGROUND OF THE INVENTION

1. Field of the Invention

The present invention generally relates to a Broadband Wireless Access (BWA) communication system, and in particular, to apparatus and method for adaptively applying a subchannel constitution scheme of a zone for relay service according to cell environmental variables in a multihop relay BWA communication system.

2. Description of the Related Art

One of the most important conditions of a 4$^{th}$ Generation (4G) communication system is a self-configurable wireless network configuration. The self-configurable wireless network refers to a wireless network which can provide mobile communication services by configuring the wireless network in an autonomous and distributive manner without control of a central system. Generally, in a 4G communication system, cells of a very small radius are installed to enable a high-speed communication and accommodate more traffic. In this case, it is anticipated that the centralized design of the 4G communication system is impossible. Accordingly, while being controlled and deployed in the distributive manner, the 4G communication system should be able to actively cope with environmental change such as joining of a new base station. To respond to this, a self-configurable wireless network is necessary in the 4G communication system.

In practice, to implement a self-configurable wireless network for the 4G communication system, a technique applied to an ad-hoc network needs to be adopted to the wireless access communication system. A representative case of this adoption is a multihop relay Broadband Wireless Access (BWA) communication system, where a multihop relay scheme of an ad-hoc network is applied to a BWA network including a stationary base station.

In a general BWA communication system, since communications between a fixed base station and a mobile station are executed through a direct link, a highly reliable wireless communication link can be easily established between the base station and the mobile station. However, since a position of the base station is fixed in a BWA communication system, wireless network configuration of the BWA communication system suffers low flexibility. As a result, it is hard for the BWA communication system to provide efficient communication services under radio conditions experiencing severe change of traffic distribution or other traffic conditions.

To overcome those shortcomings, BWA communication systems can utilize a relay service to deliver data in a multihop manner using neighbor mobile stations or relay stations. A multihop relay BWA communication system is able to reconfigure a network by promptly handling communication environmental changes and far more efficiently utilizing the entire wireless network. In addition, such a BWA communication system can provide a mobile station with a radio channel of better channel condition by installing a relay station between the base station and the mobile station and establishing a multihop relay path via the relay station. That is, the BWA communication system can provide a high speed data channel and extend a cell service coverage by providing services through the relay hop relay scheme via the relay station in a cell boundary region under poor channel conditions from the base station.

FIG. 1 shows conventional signal flows to provide service using a multihop relay scheme in a BWA communication system.

Mobile Stations (MSs) 140, 150, 160, and 170 in the multihop relay BWA communication system of FIG. 1 receive BWA services from Base Station (BS) 100 and Relay Stations (RSs) 110, 120, and 130.

The MSs 140 and 150 belonging to a service coverage 101 of the BS 100 communicate with the BS 100 using the direct MS link L1. The MS2 150, which resides in the cell boundary region of the BS 100 and suffers a poor channel status, receives a high data channel using a relay RS link L2 of the RS2 130.

The MSs 160 and 170 out of a service coverage 101 of the BS 100 communicate with the BS 100 using a relay RS link L3 of the RS1 110. In other words, the BS 100 can extend its service coverage using the RS1 110 by providing a communication link to the MSs 160 and 170 outside the service coverage. The MS4 170, which lies in the cell boundary region of the service coverage of the RS1 110 and suffers a poor channel status, can increase transmission capacity using the relay RS link L4 of the RS2 120.

As described above, a BWA communication system can achieve a cell coverage extension and a capacity increase by providing a control channel and a high data channel to MSs in a cell boundary region and a shadow area under poor channel conditions by use of a multihop relay scheme via a RS.

Recently, in BWA communication systems, research on Orthogonal Frequency Division Multiple Access (OFDMA) schemes are progressing. When a BWA communication system adopts an OFDMA scheme, by dividing an entire frequency band into a plurality of orthogonal subcarriers, a variety of subchannels can be constituted according to a subcarrier allocation scheme. For example, Institute of Electrical and Electronics Engineers (IEEE) 802.16 standard defines subchannel allocation schemes of Partial Usage Sub-Channel (PUSC), Full Usage Sub-Channel (FUSC), Optional FUSC (OFUSC), Adaptive Modulation and Coding (AMC) subchannel, Tile Usage Sub-Channel 1 (TUSC1), and TUSC2.

Hence, a BS using a OFDMA scheme can communicate using a subchannel constitution scheme suitable for cell environmental variables, such as channel condition, interference, mobility, etc.

FIG. 2 shows a conventional frame constructed using a plurality of subchannel constitution schemes in an IEEE 802.16 system. The IEEE 802.16 system of FIG. 2 adopts an OFDMA scheme.

The frame of FIG. 2 is divided to a DownLink (DL) subframe 200 and an UpLink (UL) subframe 201.

The DL subframe 200 places preamble and common control information at fixed positions (mandatory slots) of the front end. The common control information uses a fixed subchannel constitution scheme. For instance, an IEEE 802.16 system may fix the common control information in a PUSC zone.

The common control information includes a Frame Control Header (FCH). The FCH is information for decoding the control information (=DL map) relating to the DL subframe 200 in the common control information.

A receiver, which receives the DL subframe 200 from a transmitter, can decode the control information relating to the DL subframe 200 only by decoding the FCH.

Next, by checking the control information, the receiver can acquire subchannel constitution scheme information with respect to a plurality of zones of each subframe (DL/UL subframes). The receiver can acquire the subchannel constitution scheme information of each zone from an IE (Information Element) {e.g., STC_DL_Zone-_IE( ), UL_Zone_IE( ) or AAS_DL/UL_ZoneIE( )} containing zone information of the control information.

In FIG. 2, the zone drawn with a solid line uses a fixed slot using a fixed subchannel constitution scheme, and a burst zone drawn with a dotted line can change its size and subchannel constitution scheme according to the cell environment.

To support a multihop relay service in a BWA communication system, the BS needs to communicate with not only the MS but also the RS. Accordingly, the BS communicates with the MS and the RS using a frame structure as shown in FIG. 3.

FIG. 3 shows a conventional frame structure of a multihop relay BWA communication system.

In the frame of FIG. 3, DL subframe 300 and UL subframe 310 includes direct link areas 301 and 311 for communications between a BS and an MS, and indirect link areas 303 and 313 for communications between the BS and an RS.

The BS provides a sync channel, a control channel, and a traffic channel to MS connected in the direct link using the direct link area 301 of the DL subframe 300. The BS provides a sync channel, a control channel, and a traffic channel to the RS using the indirect link area 303 of the DL subframe 300. The sizes of the direct link area 301 and the indirect link area 303 may be fixed or adaptively adjusted according to the cell environment.

When a BWA communication system performs communication using the frame of FIG. 3, the RS, like the MS, communicates with the BS using the direct link area 301 at the initial access. Next, the RS is assigned a start symbol position of BS-RS link using the indirect link area 303 to provide the relay service. In doing so, the RS can decode signals transmitted at a start symbol position of the indirect link area 303 by decoding the FCH of the indirect link area 303. The RS needs to acquire the subchannel constitution scheme of the zone including the FCH to decode the FCH. However, if the sizes of the direct link area 301 and the indirect link area 303 are adaptively adjusted according to the cell environment, the RS cannot acquire the subchannel constitution scheme information of the start zone of the indirect link area 303.

As discussed above, a BWA communication system is capable of adaptively adjust sizes of a first area for a direct link and a second area for an indirect link according to a cell environment. In this case, a subchannel constitution scheme including a start point of a second area can be changed as well. Therefore, a need exists for a method enabling an RS to detect a subchannel constitution scheme of a start position of a second area in a BWA communication system.

SUMMARY OF THE INVENTION

The present invention substantially solves at least the above problems and/or disadvantages and provides at least the advantages below. Accordingly, an aspect of the present invention is to provide an apparatus and method for transmitting and detecting subchannel constitution scheme information of a link for a relay service in a multihop relay BWA communication system.

Another aspect of the present invention is to provide an apparatus and method for transmitting and detecting subchannel constitution scheme information of a link for a relay service, which is adaptively applied according to cell environmental variables, in a multihop relay BWA communication system.

A further aspect of the present invention is to provide an apparatus and method for transmitting and detecting subchannel constitution scheme information of a link for a relay service by appending a preamble to a front of a Frame Control Header (FCH) in a multihop relay BWA communication system.

Still another aspect of the present invention is to provide an apparatus and method for transmitting and detecting subchannel constitution scheme information of a link for a relay service using a sync channel of a previous frame in a multihop relay BWA communication system.

Yet another aspect of the present invention is to provide an apparatus and method for transmitting and detecting subchannel constitution scheme information of a link for a relay service using the first area's DL map of previous frame information in a multihop relay BWA communication system.

Yet another aspect of the present invention is to provide an apparatus and method for transmitting and detecting subchannel constitution scheme information of a link for a relay service by designating a fixed subchannel constitution scheme in a multihop relay BWA communication system.

The above aspects are achieved by providing a method for variously constructing an FCH zone according to cell environmental variables in a multihop relay BWA communication system.

According to an aspect of the present invention, a method for transmitting subchannel constitution scheme information in a wireless communication system includes dividing a frame, into a plurality of areas; determining a subchannel constitution scheme of a start zone of each area according to channel information; and transmitting determined subchannel constitution scheme information of the start zones using a FCH preamble.

According to another aspect of the present invention, a method for detecting subchannel constitution scheme information in a wireless communication system includes detecting physical channel signals occupied by a FCH preamble received from an upper node; checking codes of subchannel constitution schemes; and detecting a subchannel constitution scheme of a start zone of a subframe from a frame using the physical channel signals occupied by the detected FCH preamble and the codes.

According to a further aspect of the present invention, a method for transmitting subchannel constitution scheme information in a wireless communication system includes dividing a frame into a plurality of areas; determining a subchannel constitution scheme of a start zone of each area of a next frame according to channel information; and transmitting determined subchannel constitution scheme information of the start zone of each area in the next frame using a sync channel.

According still another aspect of the present invention, a method for detecting subchannel constitution scheme information in a wireless communication system includes checking a pattern to indicate a subchannel constitution scheme in a sync channel received from an upper node; checking patterns according to the subchannel constitution schemes; and detecting subchannel constitution scheme information relating to a start zone of a subframe of a next frame by comparing the sync channel pattern with the patterns of the subchannel constitution schemes.

According yet another aspect of the present invention, a method for transmitting subchannel constitution scheme information in a wireless communication system includes dividing a frame into a plurality of areas; determining a subchannel constitution scheme of a start zone of each area of a next frame according to channel information; and transmitting a DownLink (DL)-MAP including determined subchannel constitution scheme information of the start zone of each area in the next frame.

According yet another aspect of the present invention, a method for detecting subchannel constitution scheme information in a wireless communication system includes demodulating and decoding DL-MAP signals received from an upper node; and detecting subchannel constitution scheme information relating to a start zone of a subframe of a next frame from the demodulated and decoded DL-MAP signals.

According yet another aspect of the present invention, a method for transmitting subchannel constitution scheme information in a wireless communication system includes dividing a frame into a plurality of areas; checking a fixed subchannel constitution scheme of a start zone of each area; and transmitting signals according to the fixed subchannel constitution scheme of each area.

According yet another aspect of the present invention, an apparatus for transmitting subchannel constitution scheme information in a wireless communication system includes a subchannel constitution scheme determiner for determining a subchannel constitution scheme of a start zone of a subframe included to a frame according to channel information; and a frame generator for generating a subframe for a relay service, the subframe containing the determined subchannel constitution scheme.

According yet another aspect of the present invention, an apparatus for detecting subchannel constitution scheme information in a wireless communication system includes a physical channel signal detector for detecting physical channel signals occupied by a FCH preamble; and a subchannel constitution scheme detector for detecting a subchannel constitution scheme of a start zone of a subframe of a frame by comparing the detected physical channel signals with preamble codes according to subchannel constitution schemes.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a technique for applying an adaptive subchannel constitution scheme to a link for the relay service according to cell environmental variables in a multihop relay Broadband Wireless Access (BWA) communication system. Also, the present invention provides a technique for transmitting to a lower node and detecting subchannel constitution scheme information which is adaptively applied at an upper node of the BWA communication system according to the cell environmental variables. The upper node includes a Base Station (BS) or an upper Relay Station (RS), and the lower node includes a lower RS or a Mobile Station (MS).

In the following, Time Division Duplex (TDD) and Orthogonal Frequency Division Multiple Access (OFDMA) wireless communication systems are illustrated by way of example, but the present invention is applicable to communication systems based on other multiple access schemes and other division duplex schemes.

Figure 1:
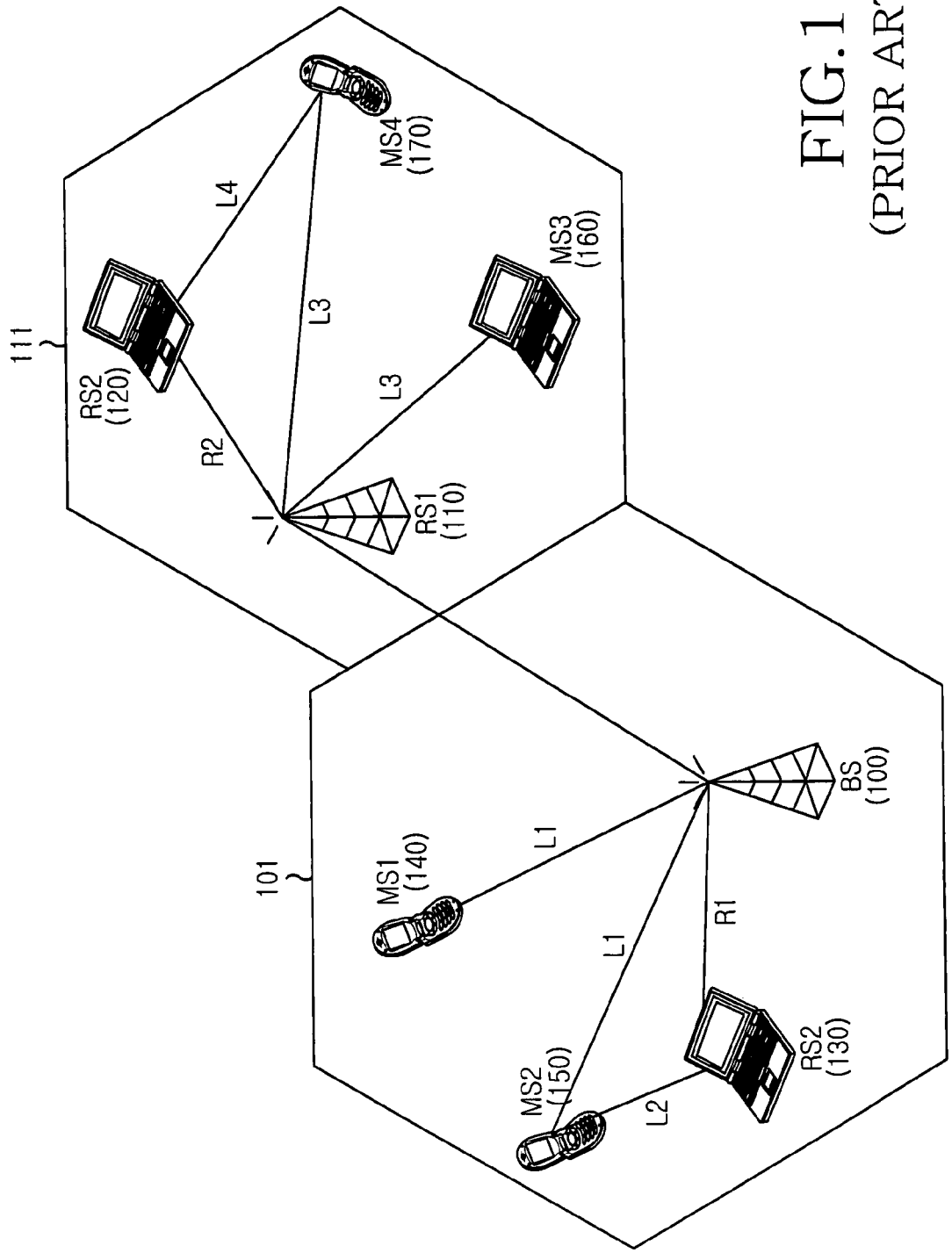
FIG. 1 illustrates conventional signals flows to provide services using a multihop relay scheme in a BWA communication system.
Figure 2:
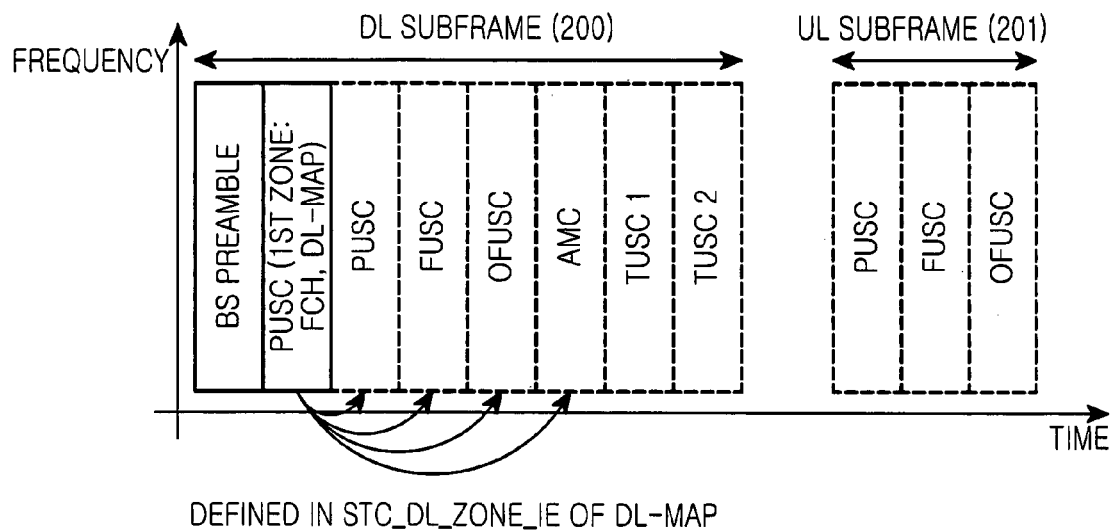
FIG. 2 illustrates a conventional frame structured using a plurality of subchannel constitution schemes in an IEEE 802.16 system.
Figure 3:
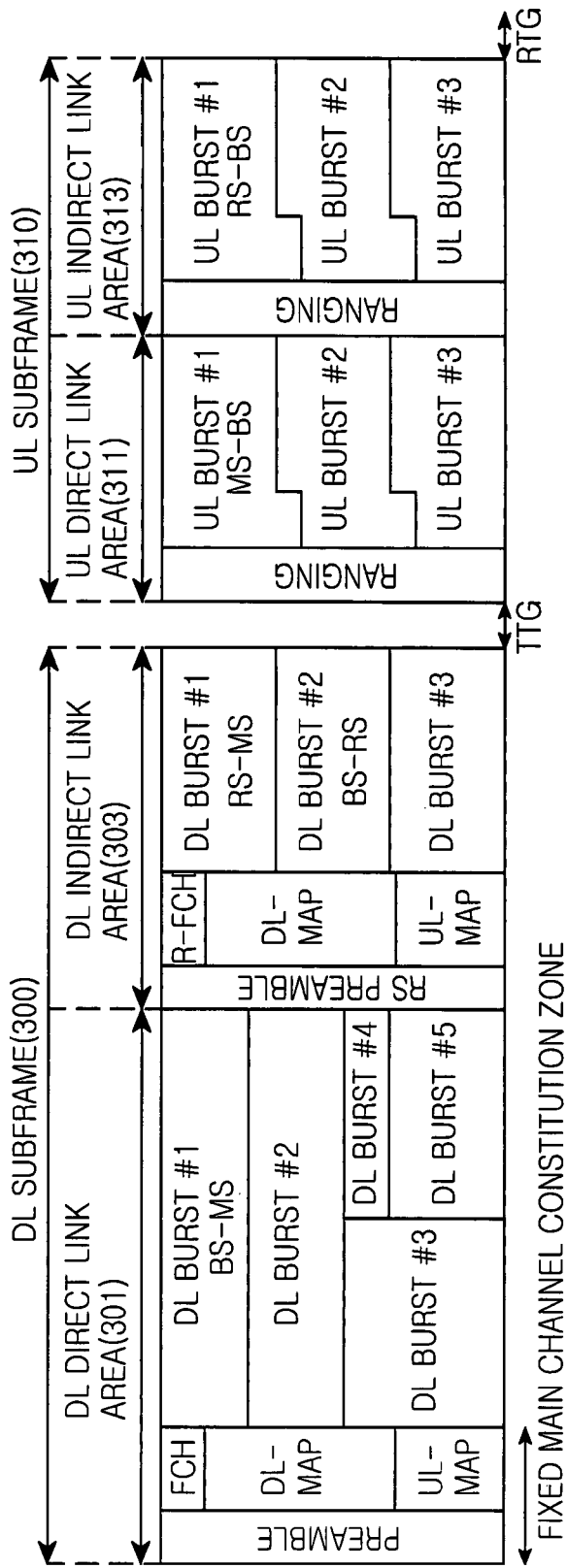
FIG. 3 illustrates a conventional frame structure of the multihop relay BWA communication system.
Figure 4:
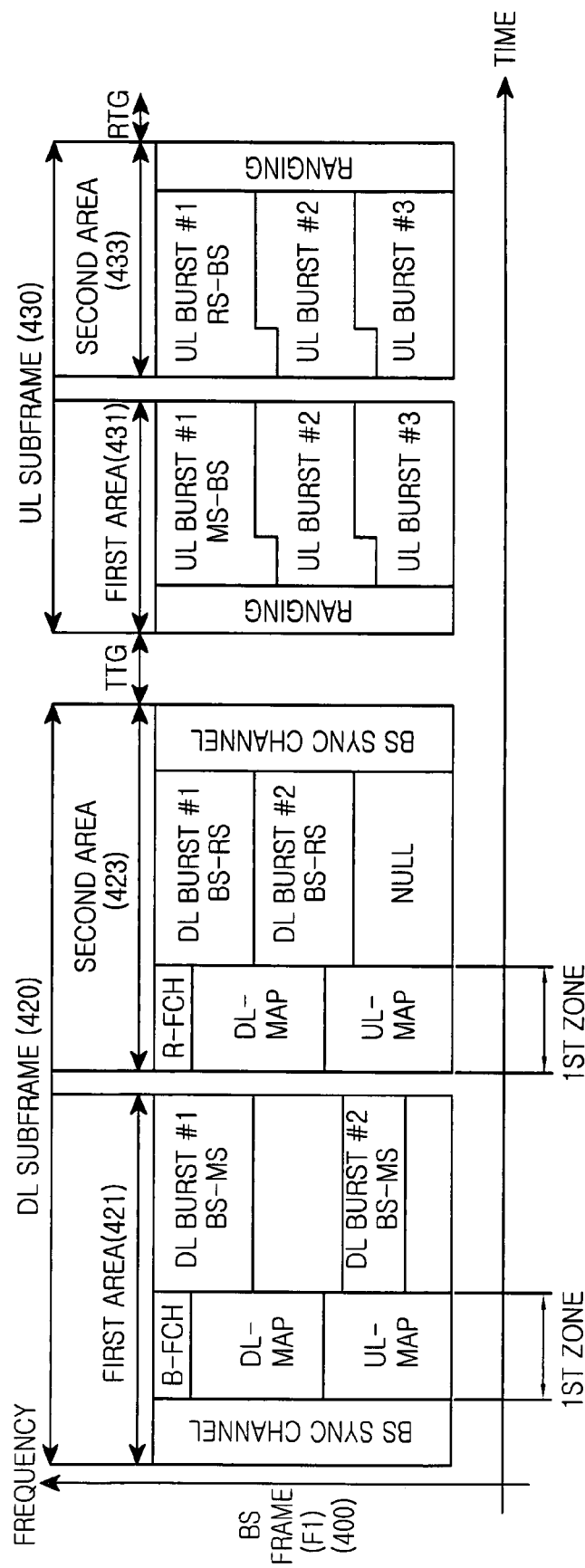
FIG. 4 illustrates a frame structure of a multihop relay BWA communication system according to the present invention.

The BS of the BWA communication system provides the MS or RS with a synchronized sync channel using a frame structure of FIG. 4.

FIG. 4 shows a frame structure of a multihop relay BWA communication system according to the present invention.

The frame of FIG. 4 includes a DownLink (DL) subframe 420 and an UpLink (UL) subframe 430. The DL subframe 420 and the UL subframe 430 are time-multiplexed and divided to first areas 421 and 431 for the BS-MS link and second areas 423 and 433 for the BS-RS link. The lengths of the first areas 421 and 431 and the second areas 423 and 433 can be fixed or dynamically changed according to the cell environment.

In the DL subframe 420, the BS transmits a sync channel, control information, and DL data to an MS connected through the direct link during the first area 421. The BS transmits control information, DL data, and a sync channel to an RS during the second area 423.

Since the control information of the first area 421 is allocated to a fixed position, the MS can acquire subchannel constitution scheme information of the control information. However, if the lengths of the first areas 421 and 431 and the second areas 423 and 433 are dynamically changed in the BWA communication system, the start point of the second area 423 of the DL subframe 420 can be altered according to the cell environment. Accordingly, the BS needs to inform the RS of the subchannel constitution scheme of the zone containing the control information of the second area 423. Specifically, the RS must know the subchannel constitution scheme of the control information of the second area 423 to decode a Frame Control Header (FCH) contained in the control information. The FCH includes information to decode a map containing control information as to bursts of the subframes. Hence, the RS has to decode the FCH to acquire the information relating to the bursts of the subframes.

Now, descriptions explain methods for transmitting and detecting subchannel constitution scheme information of a link for a relay service, which is adaptively applied according to cell environmental variables. While the BWA communication system is configured with two hops by way of example, it may be configured with more than three hops.

The BWA communication system initially fixes a subchannel constitution scheme of a link for a relay service. In more detail, the BWA communication system fixedly uses a subchannel constitution scheme of a zone (the start zone) carrying the FCH in a link for a relay service, as shown in FIG. 5.

Figure 5:
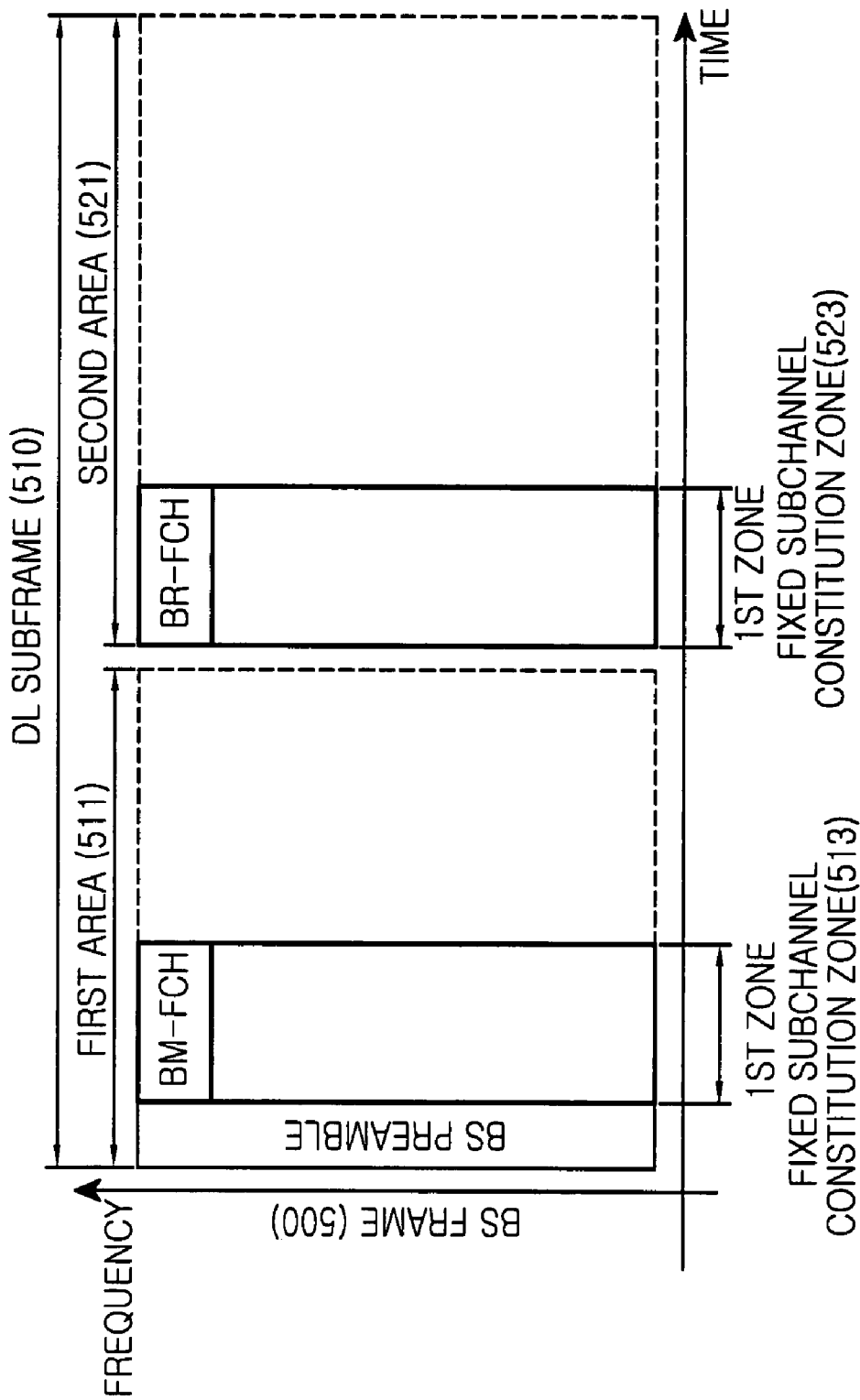
FIG. 5 illustrates a frame structure where a subchannel constitution scheme of a BS-RS link is fixed according to the present invention.

FIG. 5 shows a frame structure which fixes a subchannel constitution scheme of BS-RS link according to the present invention.

DL subframe 510 of FIG. 5 is time-divided and multiplexed to a first area 511 for BS-MS link and a second area 521 for BS-RS link for the relay service.

Subchannel constitution schemes of the first area 511 and the second area 521 for transmitting an FCH (e.g., BS-MS link FCH, BS-RS link FCH) are prescribed. That is, the BS transmits the BS-MS link FCH in the fixed subchannel constitution zone 513 according to the prescribed subchannel constitution scheme of the first area 511. The BS transmits the BS-RS FCH in the fixed subchannel constitution zone 523 according to the prescribed subchannel constitution scheme of the second area 521.

If the frame of the BWA communication system includes a plurality of zones, subchannel constitution information of other zones than the fixed subchannel constitution areas 511 and 521 of the subframes are transmitted through DL-MAP. The fixed subchannel constitution areas 511 and 521 utilize a single fixed subchannel constitution scheme. The zone is an interval constituted according to the single subchannel constitution scheme.

Next, the BWA communication system adaptively applies the subchannel constitution scheme of the area for the relay service, transmits and detects the subchannel constitution scheme information, which is now described.

Figure 6:
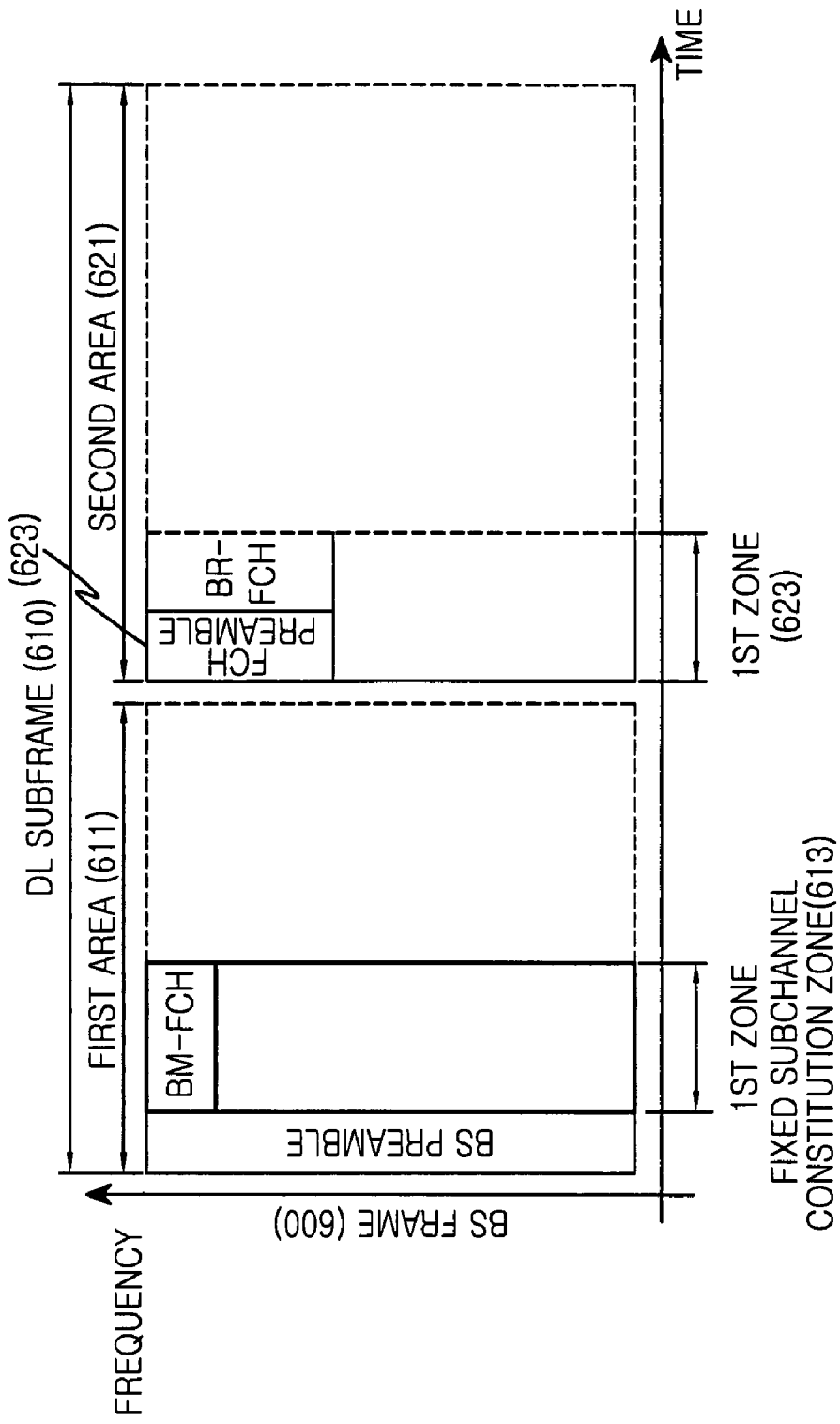
FIG. 6 illustrates a frame structure for carrying subchannel constitution scheme information of a BS-RS link using an FCH preamble according to the present invention.

The BWA communication system places a preamble at the front of the physical channel carrying FCH as to the relay service link as shown in FIG. 6. Hereafter, the preamble positioned at the front of the physical channel carrying the FCH is referred to as an FCH preamble.

FIG. 6 shows a frame structure for transmitting subchannel constitution scheme information of the BS-RS link using the FCH preamble according to the present invention.

DL subframe 610 of FIG. 6 is time-divided and multiplexed to a first area 611 for BS-MS link and a second area 621 for BS-RS link for the relay service.

The first area 611 and the second area 621 place FCH (e.g., BS-MS link FCH, BS-RS link FCH) at the start point. The first area 611 puts the BS-MS link FCH in the fixed subchannel constitution zone 613 according to a prescribed subchannel constitution scheme.

By contrast, the second area 621 places the FCH preamble 623 to front of the physical channel carrying FCH of the second area 621 to adaptively apply the subchannel constitution scheme according to the cell environmental variables. If the BS sends data to the RS in the second area 621, the physical channel structure of the FCH differs according to the subchannel constitution scheme. The BS places the FCH preamble to the front of the physical channel carrying the FCH so that the RS can acquire the subchannel constitution scheme of the FCH. The FCH preamble is constituted using a physical subchannel carrying the FCH.

As above, the transmitter of the BWA communication system transmits the subchannel constitution scheme information of the relay service link by placing the FCH preamble to the front of the physical channel carrying the FCH of the relay service link. A receiver, which receives the signal from the transmitter, can detect the subchannel constitution scheme information of the relay service link as shown in FIG. 7.

Figure 7:
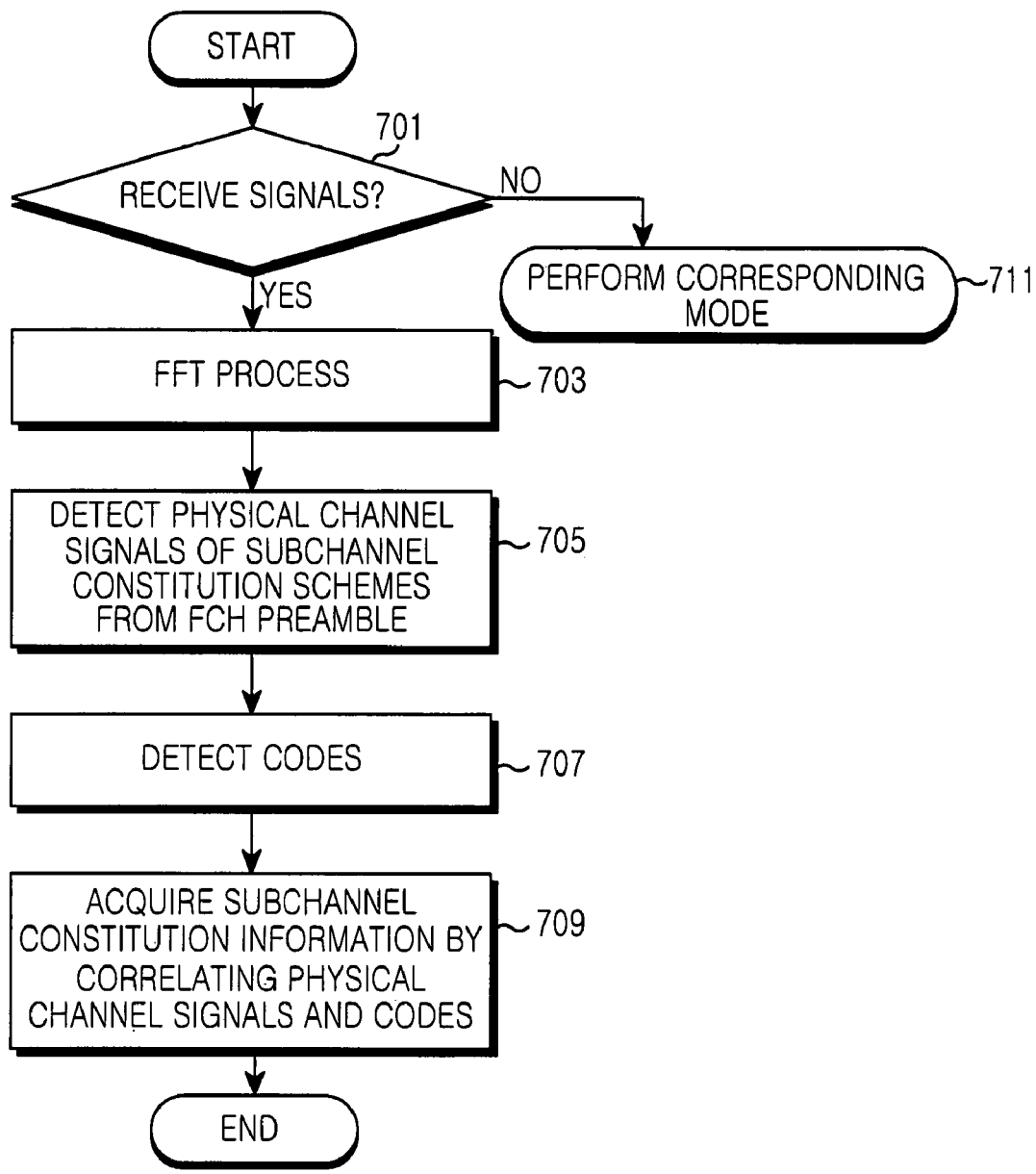
FIG. 7 illustrates a procedure of checking a subchannel constitution scheme of a BS-RS link using an FCH preamble according to the present invention.

FIG. 7 shows a procedure of checking the subchannel constitution scheme of the BS-RS link using the FCH preamble according to the present invention In FIG. 7, the receiver checks whether signals are received from the transmitter in step 701.

When no signals are received, the receiver performs a corresponding mode (e.g., standby mode) in step 711.

When the signals are received, the receiver transforms the received time-domain signals to frequency-domain signals by performing Fast Fourier Transform (FFT) in step 703.

After transforming the received signals to the frequency-domain signal, the receiver detects physical channels occupied by the FCH preamble by searching the FCH preamble signal from the frequency-domain signals in step 705.

After detecting the physical channels of the FCH preamble, the receiver checks preamble codes prescribed according to the subchannel constitution scheme in step 707. Here, in step 707, detecting codes means detecting the known signals.

In step 709, the receiver acquires the subchannel constitution scheme information of the start zone containing the FCH by correlating the physical channels according to the subchannel constitution schemes with the preamble codes. The preamble code can include not only the subchannel constitution information but also Multiple Input Multiple Output (MIMO) mode information.

Next, the receiver terminates the procedure.

Now, the BWA communication system can transmit and detect the subchannel constitution scheme information of the relay service link of the next frame using the sync channel for the RS.

Figure 8:
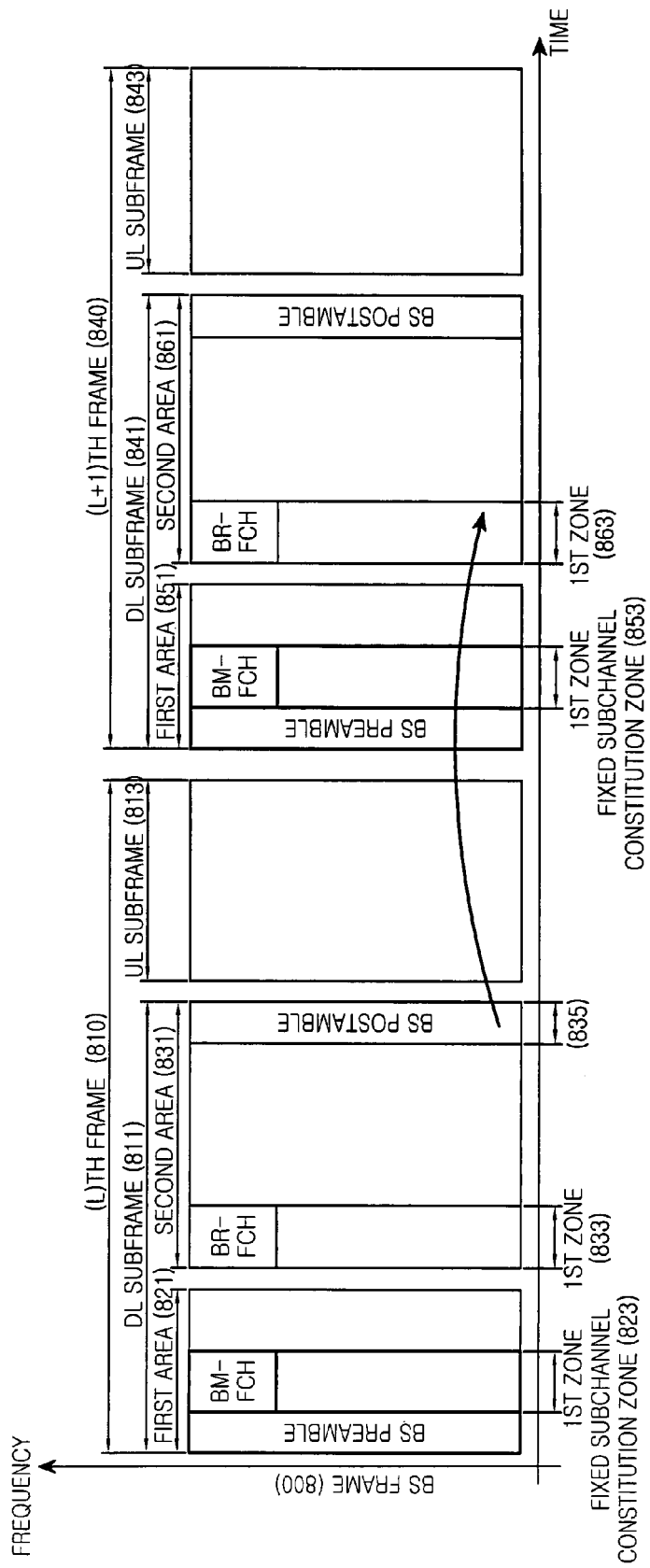
FIG. 8 illustrates a frame structure for carrying subchannel constitution scheme information of a BS-RS link using a sync channel according to the present invention.

FIG. 8 shows a frame structure for carrying the subchannel constitution scheme information of the BS-RS link using the sync channel according to the present invention.

L-th frame 810 and (L+1)-th frame 840 in FIG. 8 include DL subframes 811 and 841 and UL subframes 813 and 843.

The subframes 811, 813, 841, and 843 are time-divided and multiplexed to first areas 821 and 851 for BS-MS link, and second areas 831 and 861 for BS-RS relay service link. Although not shown in FIG. 8, the UL frames 813 and 843 each are also time-divided and multiplexed to a first area and a second area.

The first areas 821 and 851 and the second areas 831 and 861 place FCH (e.g., BS-MS link FCH, BS-RS link FCH) to the start zone of the subframe. The first area 821 and 851 place the BS-MS link FCH in the fixed subchannel constitution zones 823 and 853 according to the prescribed subchannel constitution scheme.

By contrast, the second areas 831 and 861 place the FCH by adaptively applying the subchannel constitution scheme according to the cell environmental variables. The upper node provides the lower node with the subchannel constitution scheme of the zones 833 and 863 assigned the FCH of the second areas 831 and 861 by using the sync channel for the RS in the previous frame. For instance, the subchannel constitution scheme of the start zone 833 of the second area 831 in the L-th frame 810 is designated to the sync channel in the second area 831 of the (L−1)-th frame 840. The sync channel 835 of the second area 831 of the L-th frame 810 carries the subchannel constitution scheme information of the start zone 863 of the second area 861 of the (L+1)-th frame 840. The sync channel can carry the subchannel constitution scheme information as to the start point of the second area in the next frame by taking into account the time domain or the frequency domain.

As above, the transmitter of the BWA communication system can transmit the subchannel constitution scheme information of the relay service link in the next frame by using the sync channel for the RS. In this case, the receiver, receiving the sync channel from the transmitter, can detect the subchannel constitution scheme information of the relay service link using the method of FIG. 9 or FIG. 10.

Figure 9:
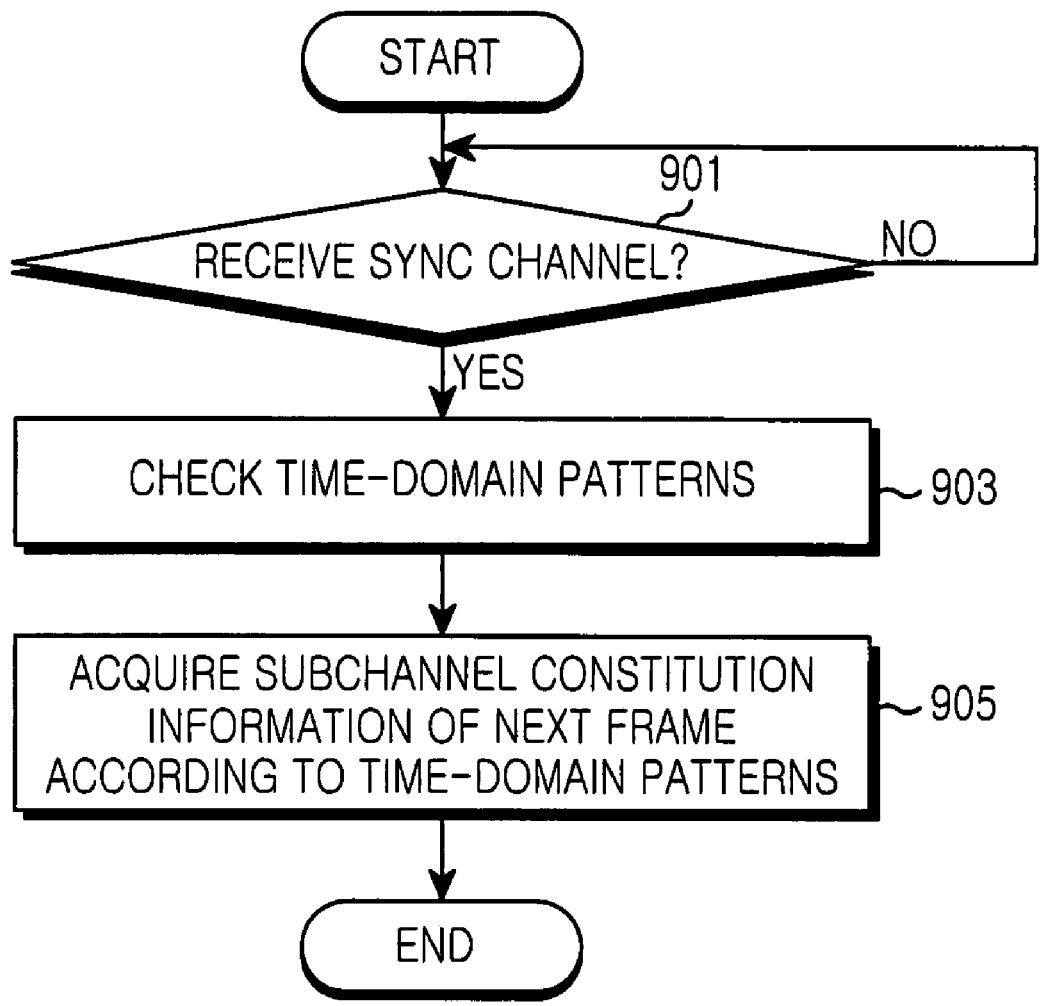
FIG. 9 illustrates a procedure of checking a subchannel constitution scheme of a BS-RS link using time-domain signals carried in a sync channel according to the present invention.

FIG. 9 shows a procedure of checking the subchannel constitution scheme of the BS-RS link using time-domain signals carried in the sync channel according to the present invention.

In FIG. 9, the receiver checks whether the sync channel for the RS is received in step 901. That is, the receiver checks whether the sync channel of the second area 831 is received in the L-th frame 810 of FIG. 8.

When receiving the sync channel, the receiver checks a sequence pattern of the sync channel in step 903.

In step 905, the receiver acquires the subchannel constitution scheme information relating to the start zone of the relay service link of the next frame according to the checked sequence pattern. Specifically, the receiver acquires the subchannel constitution scheme information of the start zone as to the second area 861 of the (L+1)-th frame 840 through the sync channel of the second area 831 of the L-th frame 810. The start zone includes the FCH of the BS-RS link.

For instance, when there exists the time domain pattern predefined as Equation (1), the receiver acquires the subchannel constitution scheme information of the same time domain pattern by checking the sequence pattern of the time domain transmitted in the sync channel.

$$P_1 = A, A, A, A$$

$$P_2 = A, -A, A, -A$$

$$P_3 = A, A, -A, -A$$

$$P_4 = A, -A, -A, A \quad (1)$$

$P_i$ indicates the sequence pattern of the i-th subchannel constitution scheme in the sync channel. If the sync channel includes one OFDMA symbol, the length of the sequence A is ¼ of the symbol interval. If the sync channel includes a plurality of OFDMA symbols, the length of the sequence A is determined by considering the sync channel interval.

Next, the receiver terminates the procedure.

Figure 10:
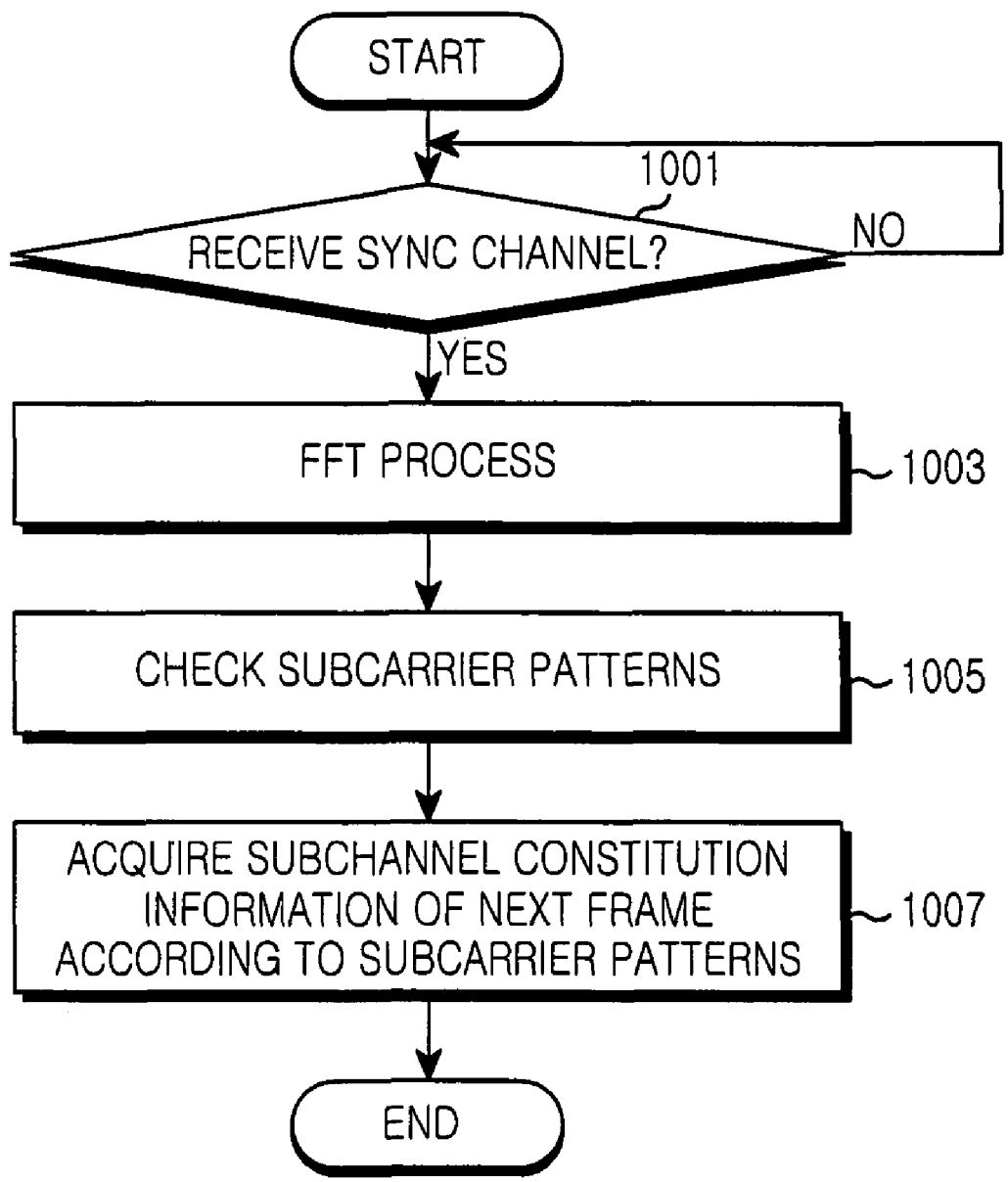
FIG. 10 illustrates a procedure of checking a subchannel constitution scheme of a BS-RS link using a frequency domain of a sync channel according to the present invention.

FIG. 10 shows a procedure of checking the subchannel constitution scheme of the BS-RS link using a frequency domain of the sync channel according to the present invention.

In FIG. 10, the receiver checks whether the sync channel for the RS is received or not in step 1001. That is, the receiver checks whether the sync channel of the second area 831 of the L-th frame 810 of FIG. 8 is received.

When the sync channel is received, the receiver transforms the received time-domain signals to frequency-domain signals through the FFT in step 1003.

After the FFT is carried out, the receiver checks the pattern of the subcarriers constituting the sync channel in the frequency domain in step 1005. In specific, the transmitter divides the subcarriers of the sync channel into a certain number of groups and transmits the groups constructed to represent the subchannel constitution scheme. For instance, the transmitter sends the subchannel constitution scheme information of the next frame using the subcarrier pattern of the sync channel as shown in FIG. 11.

The receiver checks the pattern of the subcarriers by comparing the receive powers of the groups in the frequency domain.

After checking the pattern of the subcarriers, the receiver acquires the subchannel constitution scheme information of the start zone of the BS-RS link of the next frame according to the subcarrier pattern in step 1007. The start zone includes the FCH of the BS-RS link.

Next, the receiver terminates the procedure.

Figure 11A:
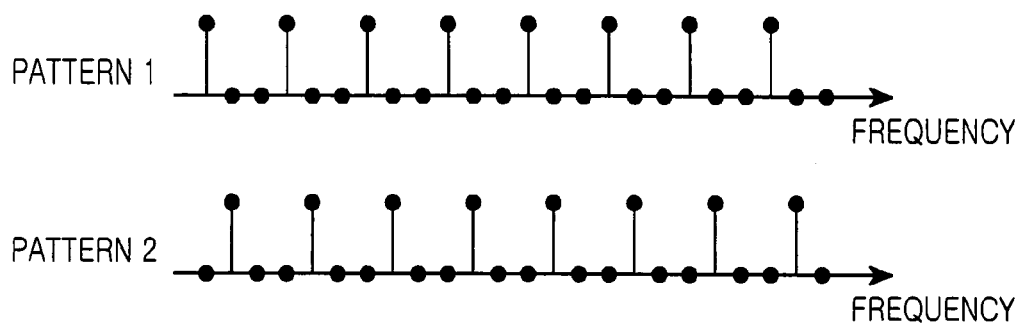
FIGS. 11A and 11B illustrate subcarrier patterns for checking a subchannel constitution scheme of a BS-RS link using a sync channel according to the present invention.
Figure 11B:
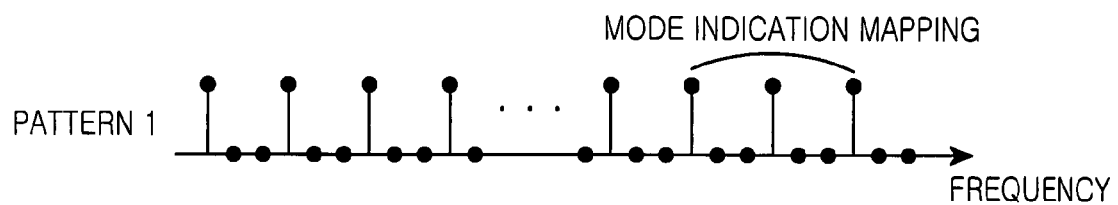

FIGS. 11A and 11B show subcarrier patterns for checking the subchannel constitution scheme of the BS-RS link using the sync channel according to the present invention.

In FIG. 11A, the transmitter divides the entire frequency band of the sync channel into three groups and transmits the subchannel constitution scheme information according to the group patterns.

The transmitter can map and transmit the subchannel constitution scheme information using part (Mode Indication Mapping) of the subcarriers of the sync channel as shown in FIG. 11B.

Lastly, the BWA communication system can transmit and detect the subchannel constitution scheme information of the BS-RS link for the relay service of the next frame using DL-MAP information.

Figure 12:
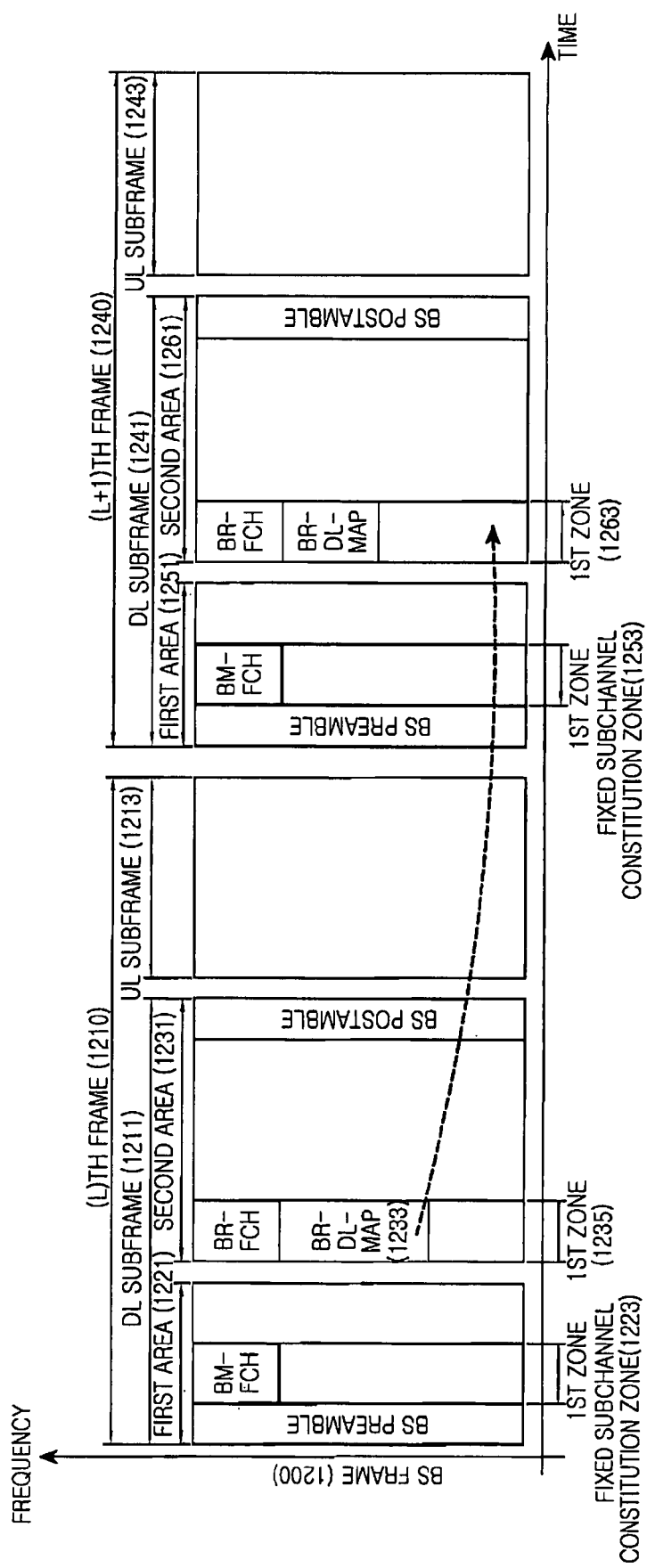
FIG. 12 illustrates a frame structure for carrying subchannel constitution scheme information of a BS-RS link using DL-MAP information according to the present invention.

FIG. 12 shows a frame structure for transmitting the subchannel constitution scheme of the BS-RS link using DL-MAP information according to the present invention.

L-th frame 1210 and (L+1)-th frame 1240 in FIG. 12 include DL subframes 1211 and 1241 and UL subframes 1213 and 1243. The subframes 1211, 1213, 1241, and 1243 are time-divided and multiplexed to first areas 1221 and 1251 for BS-MS link and second areas 1231 and 1261 for BS-RS link for the relay service. Although now shown in the drawing, the UL subframes 1213 and 1243 are time-divided and multiplexed to a first area and a second area as well.

The first areas 1221 and 1251 and the second areas 1231 and 1261 place an FCH (e.g., BS-MS link FCH, BS-RS link FCH) to the start zone of the subframes. The first areas 1221 and 1251 transmit the BS-MS link FCH in the fixed subchannel constitution zones 1223 and 1253 according to a prescribed subchannel constitution scheme.

By contrast, the second areas 1231 and 1261 place the FCH by adaptively applying the subchannel constitution scheme according to the cell environmental variables. The upper node provides the lower node with the subchannel constitution scheme of zones 1235 and 1263 assigned the FCH in the second areas 1231 and 1261 using the DL-MAP of the second area of the previous frame. For instance, the subchannel constitution scheme of the start zone 1235 of the second area 1231 of the L-th frame 1210 is included to the DL-MAP of the (L−1)-th frame. The DL-MAP 1233 of the L-th frame 1210 includes the subchannel constitution scheme information of the start zone 1263 of the second area 1261 of the (L+1)-th frame 1240.

The DL-MAP 1233 can carry the subchannel constitution scheme information of the start point of the BS-RS link of the next frame by adding one field to STC_DL_Zone_IE(Information Element) or AAS_DL_IE(Information Element) provided by IEEE 802.16 as shown in Table 1.

TABLE 1

| Syntax | Size | Notes |
|---|---|---|
| STC_DL_Zone_IE or AAS_DL_IE{ | | |
| ... | . . | |
| RS DL indicator | 1 bit | indicates the RS DL zone in next frame |
| } | | |

As shown in Table 1, since STC_DL_Zone_IE(Information Element) or AAS_DL_IE(Information Element) has fields indicative of the subchannel constitution scheme and the MIMO scheme, the subchannel constitution scheme information of the next frame uses the same fields. 1-bit indication bit is added to indicate that the corresponding information is the subchannel constitution scheme information of the next frame.

As above, the transmitter of the BWA communication system transmits the subchannel constitution scheme information of the relay service link of the next frame using DL-MAP. The receiver can detect the subchannel constitution scheme information relating to the start zone of the relay service link as shown in FIG. 13.

Figure 13:
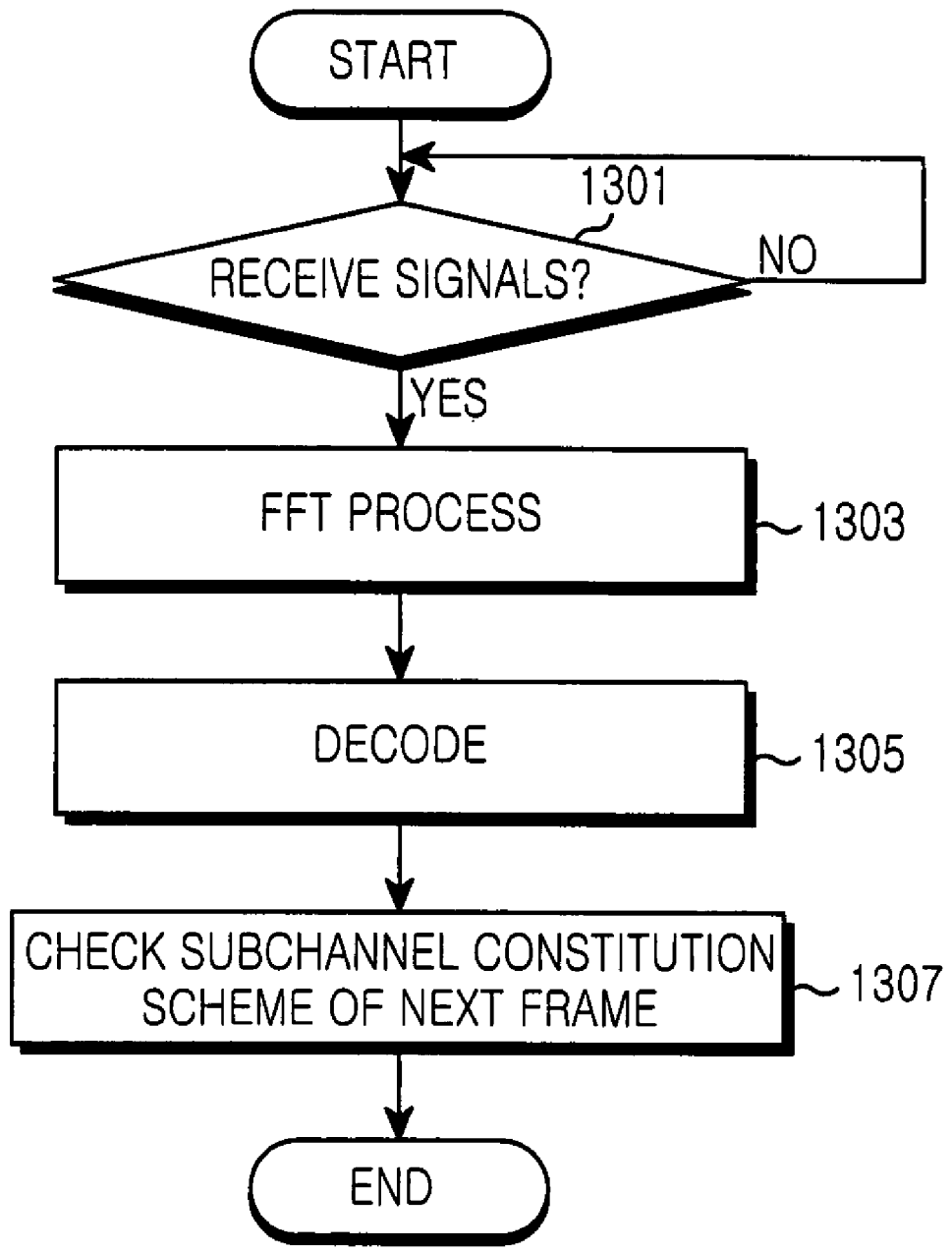
FIG. 13 illustrates a procedure of checking a subchannel constitution scheme of a BS-RS link using DL-MAP information according to the present invention.

FIG. 13 shows a procedure of checking the subchannel constitution scheme of the BS-RS link using the DL-MAP information according to the present invention.

The receiver of FIG. 13 checks whether signals are received from the transmitter in step 1301. That is, the receiver checks whether the DL-MAP in the second area 1231 of the L-th frame 1210 is received.

When signals are received, the receiver transforms the received time-domain signals to frequency-domain signals through the FFT in step 1303.

After performing the FFT, the receiver decodes the frequency-domain signals according to the corresponding modulation scheme and cording rate in step 1305.

After decoding the signals, the receiver checks the subchannel constitution scheme information relating to the start zone of the relay service link of the next frame from the DL-MAP of the decoded signals in step 1307.

Next, the receiver terminates the procedure.

As such, the BWA communication system is able to adaptively apply the subchannel constitution scheme of the start zone of the relay service link according to the cell environmental variables.

If the DL subframe of the relay service link includes a plurality of zones, the upper node fixes the subchannel constitution scheme information of the first zone, or transmits the subchannel constitution scheme information to the lower node using the FCH preamble, the sync channel of the previous frame, or the MAP information as described above. Next, the upper node transmits the subchannel constitution scheme information relating to the other zones than the first zone to the lower node using the MAP information of the first zone. If the information relating to the zone is not designated in the MAP, the lower node applies the same subchannel constitution scheme of the start zone of the subframe of the relay service link used in the previous frame to the start zone of the subframe of the relay service link of the current frame. The zone indicates a plurality of OFDMA symbol intervals defined based on one subchannel constitution scheme.

Figure 14:
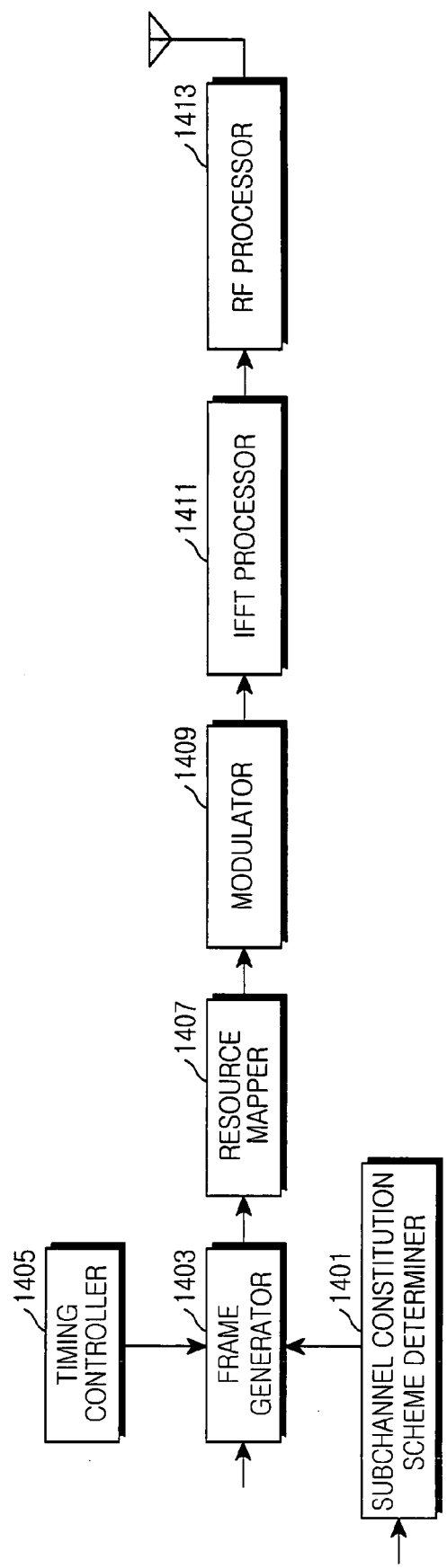
FIG. 14 is a block diagram of a transmitter for transmitting the subchannel constitution scheme information in a multihop relay BWA communication system according to the present invention.
Figure 15:
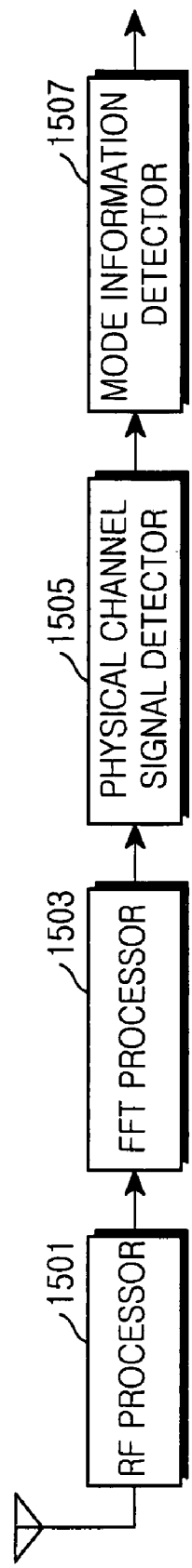
FIG. 15 is a block diagram of a receiver for checking a subchannel constitution scheme in a multihop relay BWA communication system according to the present invention.

Now, the transmitter (e.g., BS) for transmitting the subchannel constitution scheme information of the relay service link and the receiver (e.g., RS) for detecting the subchannel constitution scheme information of the relay service link in the BWA communication system are illustrated. FIGS. 14 and 15 show a transmitter and a receiver, respectively, according to the present invention.

FIG. 14 shows a transmitter for transmitting the subchannel constitution scheme information in the multihop relay BWA communication system according to the present invention.

The transmitter of FIG. 14 includes a subchannel constitution scheme determiner 1401, a frame generator 1403, a timing controller 1405, a resource mapper 1407, a modulator 1409, an Inverse Fast Fourier Transform (IFFT) processor 1411, and a Radio Frequency (RF) processor 1413.

The subchannel constitution scheme determiner 1401 determines the subchannel constitution scheme of the start zone of the BS-RS link by taking into account the cell environmental variables (e.g., channel condition, interference and mobility).

The frame generator 1403 generates the subframe to transmit to the MS connected through the direct link and the subframe to transmit to the RS from the traffic burst under the control of the timing controller 1405. For instance, the frame generator 1403 constructs the subframe (BS-MS link subframe) destined for the MS in the first area of the DL link subframe, and constructs the subframe (BS-RS link subframe) destined for the RS in the second area. In doing so, the frame generator 1403 includes the subchannel constitution scheme information of the BS-RS link to the BS-RS link subframe. In case of using the FCH preamble, the frame generator 1403 places the FCH preamble to the front of the physical channel carrying the FCH. Alternatively, the frame generator 1403 includes the start zone subchannel constitution scheme information of the second area of the next frame into the sync channel for the RS of the second area. Lastly, the frame generator 1403 includes the start zone subchannel constitution scheme information of the second area of the next frame into the DL-MAP of the second area.

The timing controller 1405 is responsible to control the transmission and reception timings of the first area for communicating with the MS and the second area for communicating with the RS.

The resource mapper 1407 allocates and outputs the subframes fed from the frame generator 1403 to the corresponding link bursts.

The modulator 1409 modulates the subframes which are allocated to the link bursts and fed from the resource mapper 1407, according to a preset modulation scheme.

The IFFT processor 1411 IFFT-processes the frequency-domain signals fed from the modulator 1409 to time-domain signals.

The RF processor 1413 up-converts the baseband signals fed from the IFFT processor 1411 to RF signals, and transmits the RF signals to the receiver (the RS) on an antenna.

FIG. 15 shows a receiver for checking the subchannel constitution scheme in the multihop relay BWA communication system according to the present invention. By way of example, the receiver detects the subchannel constitution scheme of the relay service link using the FCH preamble or the sync channel.

The receiver of FIG. 15 includes an RF processor 1501, an FFT processor 1503, a physical channel signal detector 1505, and a mode information detector 1507.

The RF processor 1501 down-converts the RF signals received on the antenna to baseband signals.

The FFT processor 1503 FFT-processes the time-domain signals fed from the RF processor 1501 to frequency-domain signals.

The physical channel signal detector 1505 detects physical channel signals according to the subchannel constitution schemes or the patterns of the time domain or the frequency domain in the sync channel from the frequency-domain signals fed from the FFT processor 1503. For instance, the physical channel signal detector 1505 detects the physical channel signals according to the subchannel constitution schemes by searching the physical channel of the FCH preamble of the frequency domain.

Alternatively, the physical channel signal detector 1505 detects the time-domain sequence pattern information in the sync channel for the RS or the subcarrier pattern information of the frequency domain.

The mode information detector 1507 detects the subchannel constitution scheme information of the start zone of the relay service link using the information provided from the physical channel signal detector 1505. The information provided from the physical channel signal detector 1505 includes the physical channel signals according to the corresponding subchannel schemes, and the pattern information of the time domain or the frequency domain in the sync channel.

As set forth above, the multihop relay BWA communication system transmits and detects the subchannel constitution scheme information of the relay service link, which is adaptively applied according to the cell environmental variables. Therefore, the subchannel constitution scheme of the relay service link can be adaptively applied based on the cell environmental variables. When establishing the communication link to the BS, the RS can accurately decode the information of the corresponding frame.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting subchannel constitution scheme information in a wireless communication system, the method comprising:

dividing a frame into a plurality of areas;
   determining a subchannel constitution scheme of a start zone of each area according to channel information; and
   transmitting determined subchannel constitution scheme information of the start zone using a Frame Control Header (FCH) preamble, wherein dividing the frame comprises:
   dividing the frame into a first area for a Base Station (BS)-Mobile Station (MS) link and a second area for a relay service.

2. The method of claim 1, wherein the subchannel constitution scheme determining step comprises:

determining the subchannel constitution scheme of the second area according to the channel information.

3. The method of claim 1, further comprising:

when the second area is constructed using at least two subchannel constitution schemes, transmitting a MAP which contains information relating to a zone constituted using a different subchannel constitution scheme from the subchannel constitution scheme of the start zone.

4. The method of claim 1, wherein the channel information includes at least one of channel condition information, interference, and mobility.

5. The method of claim 1, wherein the subchannel constitution scheme is one of Partial Usage Sub-Channel (PUSC), Full Usage Sub-Channel (FUSC), Optional FUSC (OFUSC), Adaptive Modulation and Coding (AMC) subchannel, Tile Usage Sub-Channel 1 (TUSC1), and TUSC2.

6. The method of claim 1, wherein the FCH preamble occupies a physical subchannel which carries the FCH.

7. The method of claim 1, wherein the start zone contains a FCH and a DownLink (DL)-MAP.

8. A method for detecting subchannel constitution scheme information in a wireless communication system, the method comprising:

detecting physical channel signals occupied by a Frame Control Header (FCH) preamble received from an upper node;
   checking codes of subchannel constitution schemes; and
   detecting a subchannel constitution scheme of a start zone of a subframe from a frame using the physical channel signals occupied by the detected FCH preamble and the codes,
   wherein the start zone of the subframe is a start part of a link for a relay service.

9. The method of claim 8, wherein the subchannel constitution scheme detecting step comprises:

checking the subchannel constitution scheme of the start zone by correlating the detected physical channel signals occupied by the FCH preamble and the codes.

10. The method of claim 8, wherein the subchannel constitution scheme is one of Partial Usage Sub-Channel (PUSC), Full Usage Sub-Channel (FUSC), Optional FUSC (OFUSC), Adaptive Modulation and Coding (AMC) subchannel, Tile Usage Sub-Channel 1 (TUSC1), and TUSC2.

11. A method for transmitting subchannel constitution scheme information in a wireless communication system, the method comprising:

dividing a frame into a plurality of areas;
   determining a subchannel constitution scheme of a start zone of each area of a next frame according to channel information; and
   transmitting determined subchannel constitution scheme information of the start zone of each area in the next frame using a sync channel,
   wherein dividing the frame comprises:
   dividing the frame into a first area for a Base Station (BS)-Mobile Station (MS) link and a second area for a relay service.

12. The method of claim 11, wherein the subchannel constitution scheme determining step comprises:

determining the subchannel constitution scheme of the second area according to the channel information.

13. The method of claim 11, further comprising:

when the second area is constructed using at least two subchannel constitution schemes, transmitting a MAP which contains information relating to a zone constructed using a different subchannel constitution scheme from the subchannel constitution scheme of the start zone.

14. The method of claim 11, wherein the sync channel is a sync channel for a Relay Station (RS).

15. The method of claim 11, wherein the channel information includes at least one of channel condition information, interference, and mobility.

16. The method of claim 11, wherein the subchannel constitution scheme is one of Partial Usage Sub-Channel (PUSC), Full Usage Sub-Channel (FUSC), Optional FUSC (OFUSC), Adaptive Modulation and Coding (AMC) sub-channel, Tile Usage Sub-Channel 1 (TUSC1), and TUSC2.

17. The method of claim 11, wherein the sync channel is positioned at back of a link zone for a relay service.

18. The method of claim 11, wherein the subchannel constitution scheme information transmitting step comprises:

including and transmitting the subchannel constitution scheme information using one of time-domain sequence patterns and frequency-domain subcarrier patterns of the sync channel.

19. The method of claim 11, wherein the subchannel constitution scheme information transmitting step comprises:

mapping and transmitting the subchannel constitution scheme information to a plurality of subcarriers in a subcarrier set forming the sync channel.

20. The method of claim 11, wherein the start zone contains a Frame Control Header (FCH) and a DownLink (DL)-MAP.

21. A method for detecting subchannel constitution scheme information in a wireless communication system, the method comprising:

checking a pattern to indicate a subchannel constitution scheme in a sync channel received from an upper node;

checking patterns according to the subchannel constitution schemes; and detecting subchannel constitution scheme information relating to a start zone of a subframe of a next frame by comparing a sync channel pattern with the patterns of the subchannel constitution schemes, wherein the start zone of the subframe is a start part of a link zone for a relay service.

22. The method of claim 21, wherein the subchannel constitution scheme is one of Partial Usage Sub-Channel (PUSC), Full Usage Sub-Channel (FUSC), Optional FUSC (OFUSC), Adaptive Modulation and Coding (AMC) sub-channel, Tile Usage Sub-Channel 1 (TUSC1), and TUSC2.

23. The method of claim 21, wherein the patterns of the subchannel constitution schemes indicate one of time-domain sequence patterns and frequency-domain subcarrier patterns.

24. The method of claim 21, further comprising:

checking subchannel constitution scheme information mapped to a plurality of subcarriers of subcarriers forming the sync channel.

25. A method for transmitting subchannel constitution scheme information in a wireless communication system, the method comprising:

dividing a frame into a plurality of areas;

determining a subchannel constitution scheme of a start zone of each area of a next frame according to channel information; and transmitting a DownLink (DL)-MAP including determined subchannel constitution scheme information of the start zone of each area in the next frame, wherein dividing the frame comprises:

dividing the frame into a first area for a Base Station (BS)-Mobile Station (MS) link and a second area for a relay service.

26. The method of claim 25, wherein the subchannel constitution scheme determining step comprises:

determining the subchannel constitution scheme of the second area according to the channel information.

27. The method of claim 25, further comprising:

when the second area is constructed using at least two subchannel constitution schemes, transmitting a MAP which contains information relating to a zone constructed using a different subchannel constitution scheme from the subchannel constitution scheme of the start zone.

28. The method of claim 25, wherein the channel information includes at least one of channel condition information, interference, and mobility.

29. The method of claim 25, wherein the subchannel constitution scheme is one of Partial Usage Sub-Channel (PUSC), Full Usage Sub-Channel (FUSC), Optional FUSC (OFUSC), Adaptive Modulation and Coding (AMC) sub-channel, Tile Usage Sub-Channel 1 (TUSC1), and TUSC2.

30. The method of claim 25, wherein the start zone contains a Frame Control Header (FCH) and a DL-MAP.

31. A method for detecting subchannel constitution scheme information in a wireless communication system, the method comprising:

demodulating and decoding downlink (DL)-MAP signals received from an upper node: and detecting subchannel constitution scheme information relating to a start zone of a subframe of a next frame from the demodulated and decoded DL-MAP signals, wherein the start zone of the subframe is a start part of a link zone for a relay service.

32. The method of claim 31, wherein the subchannel constitution scheme is one of Partial Usage Sub-Channel (PUSC), Full Usage Sub-Channel (FUSC), Optional FUSC (OFUSC), Adaptive Modulation and Coding (AMC) sub-channel, Tile Usage Sub-Channel 1 (TUSC1), and TUSC2.

33. A method for transmitting subchannel constitution scheme information in a wireless communication system, the method comprising:

dividing a frame into a plurality of areas;

checking a fixed subchannel constitution scheme of a start zone of each area; and transmitting signals according to the fixed subchannel constitution scheme of each area, wherein dividing the frame comprises:

dividing the frame into a first area for a Base Station (BS)-Mobile Station (MS) link and a second area for a relay service.

34. The method of claim 33, wherein the subchannel constitution scheme is one of Partial Usage Sub-Channel (PUSC), Full Usage Sub-Channel (FUSC), Optional FUSC (OFUSC), Adaptive Modulation and Coding (AMC) sub-channel, Tile Usage Sub-Channel 1 (TUSC1), and TUSC2.

35. An apparatus for transmitting subchannel constitution scheme information in a wireless communication system, the apparatus comprising:
- a subchannel constitution scheme determiner for determining a subchannel constitution scheme of a start zone of a subframe included to a frame according to channel information; and
- a frame generator for generating a subframe for a relay service, the subframe containing the determined subchannel constitution scheme,
- wherein the frame generator constructs a Base Station (BS)-Mobile Station (MS) link subframe in a first area of a frame, and constructs the subframe for the relay service in a second area of the frame.

36. The apparatus of claim 35, wherein the channel information includes at least one of channel condition, interference, and mobility.

37. The apparatus of claim 35, wherein the subchannel constitution scheme is one of Partial Usage Sub-Channel (PUSC), Full Usage Sub-Channel (FUSC), Optional FUSC (OFUSC), Adaptive Modulation and Coding (AMC) subchannel, Tile Usage Sub-Channel 1 (TUSC1), and TUSC2.

38. The apparatus of claim 35, wherein the frame generator includes the subchannel constitution scheme information of the start zone to a subframe of a link for the relay service using a Frame Control Header (FCH) preamble.

39. The apparatus of claim 35, wherein the subchannel constitution scheme determiner determines a subchannel constitution scheme of a start zone of a subframe in a next frame using the channel information.

40. The apparatus of claim 39, wherein the frame generator includes subchannel constitution scheme information of the start zone of the subframe of the next frame into a sync channel of the subframe of the relay service link.

41. The apparatus of claim 39, wherein the frame generator includes subchannel constitution scheme information of the start zone of the subframe of the next frame to a downlink (DL)-MAP of the subframe of a relay service link.

42. An apparatus for detecting subchannel constitution scheme information in a wireless communication system, comprising:
- a physical channel signal detector for detecting physical channel signals occupied by a Frame Control Header (FCH) preamble: and
- a subchannel constitution scheme detector for detecting a subchannel constitution scheme of a start zone of a subframe of the frame by comparing the detected physical channel signals with preamble codes according to subchannel constitution schemes,
- wherein the start zone of the subframe is a start part of a link zone for a relay service.

43. The apparatus of claim 42, wherein the subchannel constitution scheme is one of Partial Usage Sub-Channel (PUSC), Full Usage Sub-Channel (FUSC), Optional FUSC (OFUSC), Adaptive Modulation and Coding (AMC) subchannel, Tile Usage Sub-Channel 1 (TUSC1), and TUSC2.

44. The apparatus of claim 42, wherein the subchannel constitution scheme detector detects a subchannel constitution scheme of a start zone of a relay service area by correlating the detected physical channel signals with the preamble codes of the subchannel constitution schemes.

45. An apparatus for detecting subchannel constitution scheme information in a wireless communication system, comprising:
- a pattern detector for detecting pattern information to indicate a subchannel constitution scheme from a sync channel received from an upper node; and
- a subchannel constitution scheme detector for detecting subchannel constitution scheme information of a start zone of a subframe of a next frame by comparing patterns of the subchannel constitution schemes with the detected pattern information,
- wherein the start zone of the subframe is a start part of a link zone for a relay service.

46. The apparatus of claim 45, wherein the subchannel constitution scheme is one of Partial Usage Sub-Channel (PUSC), Full Usage Sub-Channel (FUSC), Optional FUSC (OFUSC), Adaptive Modulation and Coding (AMC) subchannel, Tile Usage Sub-Channel 1 (TUSC1), and TUSC2.

47. The apparatus of claim 45, wherein the pattern detector detects time-domain sequence patterns or frequency-domain subcarrier patterns from the sync channel received from the upper node.

48. The apparatus of claim 45, wherein the subchannel constitution scheme detector detects a subchannel constitution scheme of a start zone of a relay service link by comparing the patterns of the subchannel constitution schemes with the detected pattern information.

49. An apparatus for detecting subchannel constitution scheme information in a wireless communication system, comprising:
- a receiver for receiving signals from an upper node; and
- a subchannel constitution scheme detector for detecting subchannel constitution scheme information of a start zone of a subframe of a next frame from a downlink (DL)-MAP of the received signals,
- wherein the start zone of the subframe is a start part of a link zone for a relay service.

50. The apparatus of claim 49, wherein the subchannel constitution scheme is one of Partial Usage Sub-Channel (PUSC), Full Usage Sub-Channel (FUSC), Optional FUSC (OFUSC), Adaptive Modulation and Coding (AMC) subchannel, Tile Usage Sub-Channel 1 (TUSC1), and TUSC2.

51. The apparatus of claim 49, wherein the receiver comprises:
- an antenna for receiving the signals from the upper node;
- a Radio Frequency (RF) processor for converting RF signals received on the antenna to baseband signals;
- a Fast Fourier Transform (FFT) processor for FFT-processing time-domain signals fed from the RF processor; and
- a decoder for decoding signals fed from the FFT processor.

52. The apparatus of claim 49, wherein the subchannel constitution scheme detector detects the subchannel constitution scheme of the start zone of the relay service link from the DL-MAP.

* * * * *